(12) United States Patent  (10) Patent No.: US 8,630,054 B2
Bennett et al.  (45) Date of Patent: Jan. 14, 2014

(54) SYSTEMS AND METHODS FOR DATA THROTTLING DURING DISK DRIVE POWER DOWN

(75) Inventors: George J. Bennett, Murrieta, CA (US); Steven R. Vasquez, Rancho Santa Margarita, CA (US); Robert P. Ryan, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 152 days.

(21) Appl. No.: 13/239,176

(22) Filed: Sep. 21, 2011

(65) Prior Publication Data

US 2013/0070363 A1 Mar. 21, 2013

(51) Int. Cl.
*G11B 15/46* (2006.01)

(52) U.S. Cl.
USPC .......................................... 360/73.03; 360/55

(58) Field of Classification Search
USPC .............. 360/55, 75, 73.03, 69, 77.05, 78.04, 360/78.06; 714/24; 711/113
See application file for complete search history.

(56) References Cited

U.S. PATENT DOCUMENTS

| | | | |
|---|---|---|---|
| 6,295,577 B1 | 9/2001 | Anderson et al. | |
| 6,516,426 B1 | 2/2003 | Forehand et al. | |
| 6,549,359 B1 | 4/2003 | Bennett et al. | |
| 6,549,361 B1 | 4/2003 | Bennett et al. | |
| 6,566,832 B2 * | 5/2003 | Ataee | 318/560 |
| 6,574,062 B1 | 6/2003 | Bennett et al. | |
| 6,577,465 B1 | 6/2003 | Bennett et al. | |
| 6,725,397 B1 | 4/2004 | Emberty et al. | |
| 6,957,355 B2 | 10/2005 | Acton et al. | |
| 6,970,319 B1 | 11/2005 | Bennett et al. | |
| 7,062,675 B1 | 6/2006 | Kemeny et al. | |
| 7,068,460 B2 | 6/2006 | Brenden et al. | |
| 7,082,373 B2 | 7/2006 | Holle | |
| 7,124,321 B2 | 10/2006 | Garnett et al. | |
| 7,161,757 B1 | 1/2007 | Krishnamoorthy et al. | |
| 7,309,967 B2 | 12/2007 | Moser et al. | |
| 7,430,089 B2 | 9/2008 | Suzuki et al. | |
| 7,633,702 B1 | 12/2009 | Heimbaugh | |
| 7,661,002 B2 | 2/2010 | Pecone et al. | |
| 7,800,856 B1 | 9/2010 | Bennett et al. | |
| 7,907,634 B2 | 3/2011 | Hildebrand et al. | |
| 7,974,038 B2 | 7/2011 | Krishnan et al. | |
| 2004/0158771 A1 | 8/2004 | Garnett et al. | |
| 2005/0125600 A1 | 6/2005 | Ehrlich | |
| 2007/0219747 A1 | 9/2007 | Hughes et al. | |

\* cited by examiner

*Primary Examiner* — Ali Neyzari

(57) ABSTRACT

Some embodiments of the invention are directed to a data storage system that includes a disk and solid-state non-volatile memory (NVM). During a power failure, the data storage system may use back EMF (BEMF) voltage from the spindle motor of the disk to park the heads of the disk and/or store data in the NVM. In one embodiment, a demand regulation circuit regulates loads that use voltage generated from the BEMF. The demand regulation circuit may be used to selectively cause a controller to adjust the rate of programming to the NVM in order to reduce the load. For example, the demand regulation circuit may assert a throttle signal to the controller upon detecting that the voltage generated from the BEMF is below a certain threshold. Programming rate may be throttled, programming cycles may be staggered, and/or programming time may be lengthened. Throttling may enable the use of smaller circuitry.

22 Claims, 17 Drawing Sheets

SYSTEMS AND METHODS FOR DATA THROTTLING DURING DISK DRIVE POWER DOWN

BACKGROUND

1. Technical Field

The present invention relates to disk drives and data storage systems for computer systems. More particularly, the present invention relates to systems and methods for enhancing power management during a spin down mode in which power is extracted from the spindle of a disk.

2. Description of the Related Art

Disk drives typically comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

When the disk spins down, e.g., due to a power interruption, it is important to park the head before the air bearing dissipates to prevent damage to the head and/or the disk. In disk drives wherein the head is parked in a landing zone on the disk, it is also important to brake the spindle motor as quickly as possible to minimize head wear. Conventionally, during a power failure the head is parked using the back EMF (BEMF) present in the motor windings due to the angular momentum of the spindle and disk assembly. The current induced by the BEMF charges a capacitor to thereby generate an internal supply voltage which is applied to a voice coil motor (VCM) to park the head. Once the head is parked, a braking torque is applied to the spindle motor to stop it from rotating as quickly as possible in order to minimize head wear. The internal supply voltage needs to be managed carefully to support the above described head parking function, as well as any operation the disk may need to perform in such a situation.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

Figure 1:
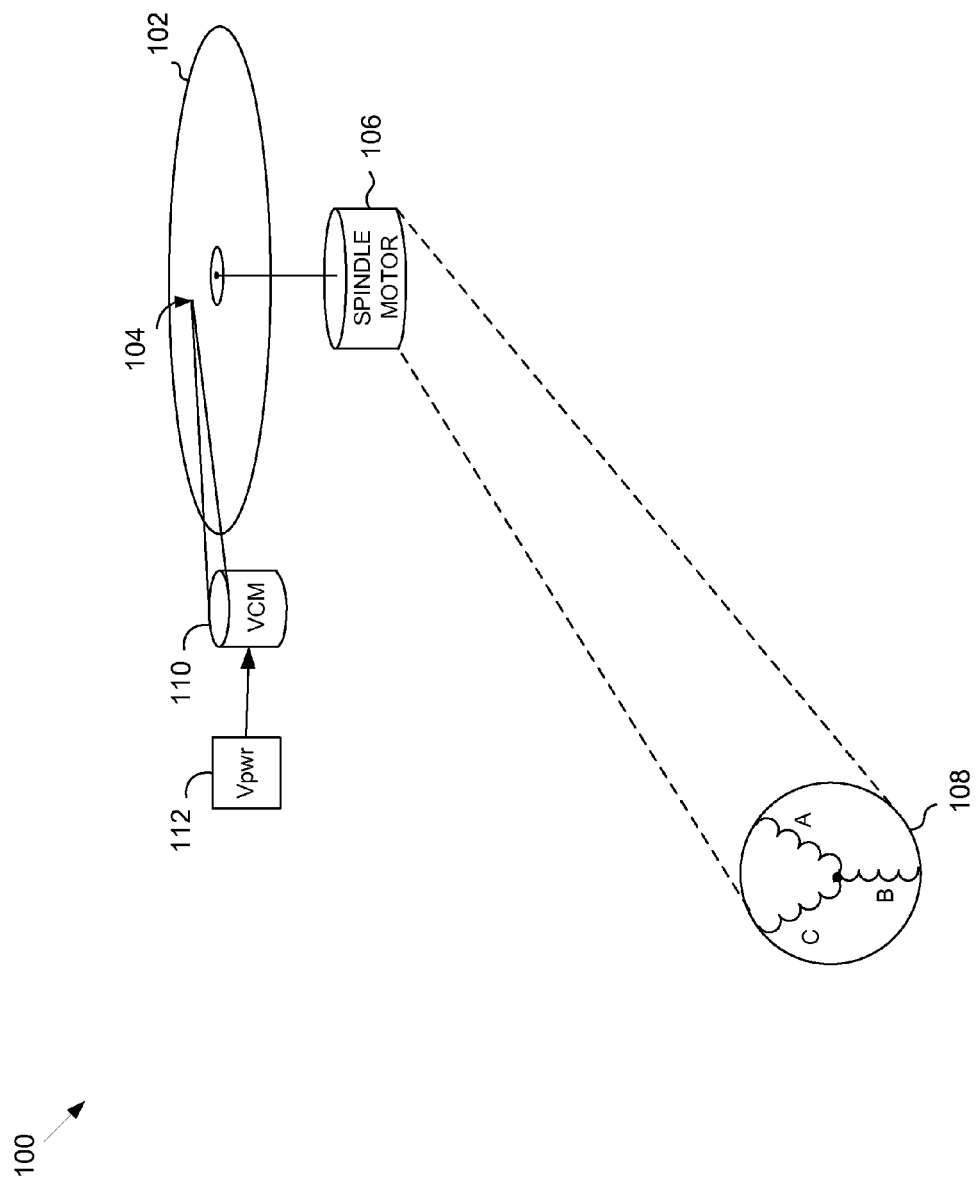
FIG. 1 shows a disk drive/data storage system according to some embodiments of the invention.

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

Overview

Embodiments of the data storage system provided herein are configured to perform improved energy or power transfer mechanisms during power down, loss, or failure. Although "disk" and "head" are used throughout this disclosure, those skilled in art would appreciate that multiple disks (or platters) and heads can be used in some embodiments. Various types of data storage systems/disk drives can include non-volatile memory (NVM) (e.g., solid-state memory) for storing data in the event of a power interruption. Storing data in non-volatile memory in the event of a power failure can improve overall performance (e.g., by enabling use of a larger write cache), and/or may be necessary to prevent loss of data during power failure. In addition, hybrid drives may include solid-state non-volatile memory for performing boosting functions where frequently accessed data is stored in the solid-state non-volatile memory instead of, or in addition to, the hard disk to increase performance.

A data storage system/disk drive that includes a disk and non-volatile memory may need to perform at least two tasks during power failure: park the head and program data (e.g., user data, system data, or both) into non-volatile memory. Typically, non-volatile memory (e.g., solid-state memory) programming cannot tolerate power interruptions because data can become corrupted. Programming can take up to 1-2 milliseconds, during which power cannot be interrupted. However, voltage generated using BEMF is also used for parking the head, and thus must be managed to ensure head parking and programming functions are completed in an efficient manner. Some embodiments of the invention use BEMF generated power more efficiently in order to provide sufficient power to park the head and program as much data as possible into the non-volatile memory during a power failure.

In one embodiment of the invention, a demand regulation circuit is used to regulate loads connected to an internal supply voltage generated from the BEMF. In one embodiment, the internal supply voltage is supplied to a controller for programming data to non-volatile memory during a power interruption, and the demand regulation circuit is used to selectively cause the controller to adjust a rate of data programming of the non-volatile memory in order to reduce its load on the internal supply voltage. For example, the demand regulation circuit may assert a discrete digital throttle signal to the controller upon detecting that the internal supply voltage is below a certain threshold level. In other embodiments, the throttle signal may be asserted directly to the logic circuitry coupled with the solid-state non-volatile memory to regulate a rate of data programming. The rate of data programming may be throttled and/or programming cycles may be lengthened. In another embodiment, in response to the assertion of the discrete digital throttle signal, the controller may be configured to stagger programming cycle start times during programming of multiple solid-state memory devices in the data storage system/disk drive. Data throttling may enable the use of a smaller sized capacitor associated with one or more loads (including the controller).

The controller and/or the logic circuitry coupled with the solid-state non-volatile memory may take several types of action (alone or in combination) when the throttle signal is asserted. For example, it may: (1) not start any new drive operations (such as non-volatile memory programming cycles) and allow current drive operations to finish, (2) modify the start of new drive operations in such a manner as to match the load to the available power, and (3) infer the load caused by various drive operations from observations of the internal supply voltage rail.

In one embodiment, because energy stored in the spindle is not drawn whenever throttle is asserted, the energy is saved for later operations. So the spin down time is correspondingly lengthened when such a throttle signal is asserted. Then, delayed operations, are simply completed during the extended time, largely making up for the delay. Since the spindle motor rotational speed and circuit load tolerances affect the available peak power, this aspect of the invention is what compensates for such variations.

In one or more embodiments, in addition to programming data to the non-volatile memory, multiple other loads such as a voice coil motor (VCM), pre-amplification, and other functions are also supplied power from the same internal supply voltage generated from the BEMF voltage. Separate drive electronics may be used to control each load. In such an arrangement, the demand regulation circuit may be adapted to provide load prioritization.

In one embodiment, load priority can be established in two ways: by tiered threshold levels or by logic control. For example, logic control can correspond to throttling a lower priority load, while not throttling a higher priority load. For example, in a tiered threshold configuration, a second lower threshold voltage can be used for the VCM. As the internal supply voltage is pulled lower during periods of heavy current drawn by the load, controller and/or solid-state memory logic may be shut down first, allowing more of the total available power to be used by VCM. After VCM transient load (e.g., moving the head) is reduced, the internal supply voltage rises again, and the logic may be turned on when a higher threshold voltage is reached. In some embodiments, the logic control may include timing functions, and the logic control may produce a better load distribution and a smaller circuit. In some embodiments, the loads can be isolated and provided with their own energy reservoirs, which when dissipated cause a smooth rejoinder to the internal supply voltage.

One embodiment of the invention is directed to a data storage system comprising, a disk, a head, a spindle motor for rotating the disk, the spindle motor comprising a plurality of windings and a rotor rotatable at a variable spin rate wherein the rotor generates a back EMF (BEMF) voltage across the windings proportional to the spin rate of the rotor, a plurality of switching elements coupled to the windings; switch control logic for generating switch control signals applied to the switching elements for generating an internal supply voltage from the BEMF during a spin down mode, the internal supply voltage enabling one or more components in the data storage system to perform an operation in an event of a power interruption to the data storage system; and a demand regulation circuit for regulating the amount power supplied to one or more of the above described components for performing power down related functions to increase an amount of time the spindle motor remains spinning in the event of a power interruption. In one embodiment, one such component is a controller for controlling data operations to non-volatile memory.

Another embodiment of the invention is directed to a method for managing power in a data storage system during a spin down mode, the data storage system comprising: a disk, a head, a spindle motor for rotating the disk, the spindle motor comprising a plurality of windings and a rotor rotatable at a variable spin rate wherein the rotor generates a back EMF (BEMF) voltage across the windings proportional to the spin rate of the rotor; a plurality of switching elements coupled to the windings; and switch control logic for generating switch control signals applied to the switching elements for generating an internal supply voltage from the BEMF during a spin down mode, the internal supply voltage enabling one or more component in the data storage system to perform an operation in an event of a power interruption to the data storage system, the method comprising: asserting a demand limit signal to the one or more component in response to detecting that the internal supply voltage falls below a predetermined level, thereby increasing an amount of time the spindle motor remains spinning in the event of a power interruption, the one or more component comprising a controller for controlling data operations to non-volatile memory.

In some embodiments, the use of a demand regulation circuit to regulate data programming rate in the solid-state non-volatile memory and/or other disk drive functions is beneficial in the following aspects. First, the energy transfer from the spindle motor to the disk drive electronics is more efficient because of a reduction in time duration during which a peak current is drawn from the spindle motor. Enhanced efficiency increases the total spin down time and allows for an increased total amount of data that can be stored in the non-volatile memory. This results in a larger feasible cache size and better drive performance. Second, the technique naturally allows power trading between power down operations and systems. Specifically, additional improvements in the VCM park circuit power efficiency directly result in more available power for the digital logic in the controller. Thus, the minimum cache size protected by non-volatile memory with the power down system can be increased with each improvement in the parking power down system. Third, this arrangement largely compensates for the large variations in peak power availability found in large production volumes of hard disks and obviates the need to directly calculate load demands, which can be non-linear. Fourth, fewer and smaller energy storage elements can be used, resulting in lower circuit costs.

System Overview

FIG. 1 illustrates a disk drive 100 according to some embodiments of the invention. Disk drive 100 comprises a disk 102, a head 104 actuated radially over the disk 102, and a spindle motor 106 for rotating the disk 102. The spindle motor 106 comprises a plurality of windings 108 and a rotor rotatable at a variable spin rate, wherein the rotor generates a back EMF (BEMF) voltage across the windings 108 proportional to the spin rate of the rotor. During a spin down mode, BEMF voltage is used to generate an internal supply voltage Vpwr 112 for parking the head 104 and for performing other operations. The internal supply voltage Vpwr 112 is applied to a voice coil motor (VCM) 110 in order to park the head 104 during the spin down mode. In some embodiments, the internal supply voltage Vpwr 112 is used to park the head 104 in response to a power failure or power down condition. In some embodiments, the internal supply voltage Vpwr 112 is used to park the head 104 during a normal spin down mode, for example, when the disk drive is placed in an idle mode.

FIG. 2 illustrates a disk drive 200 according to some embodiments of the invention. Disk drive 200 comprises a disk 102, an actuator arm 4, a head 104 connected to a distal end of the actuator arm 4, and a ramp 8 near an outer periphery of the disk 102. The disk 102 comprises a plurality of data tracks 10 and a first and second set of reserved tracks 12A and 12B, wherein the first set of reserved tracks 12A are located at a first radial location, and the second set of reserved tracks 12B are located at a second radial location different than the first radial location. The disk drive further comprises control circuitry 14. In some embodiments, when a power failure is detected the head is unloaded onto the ramp 8.

Figures 2A, 2B:
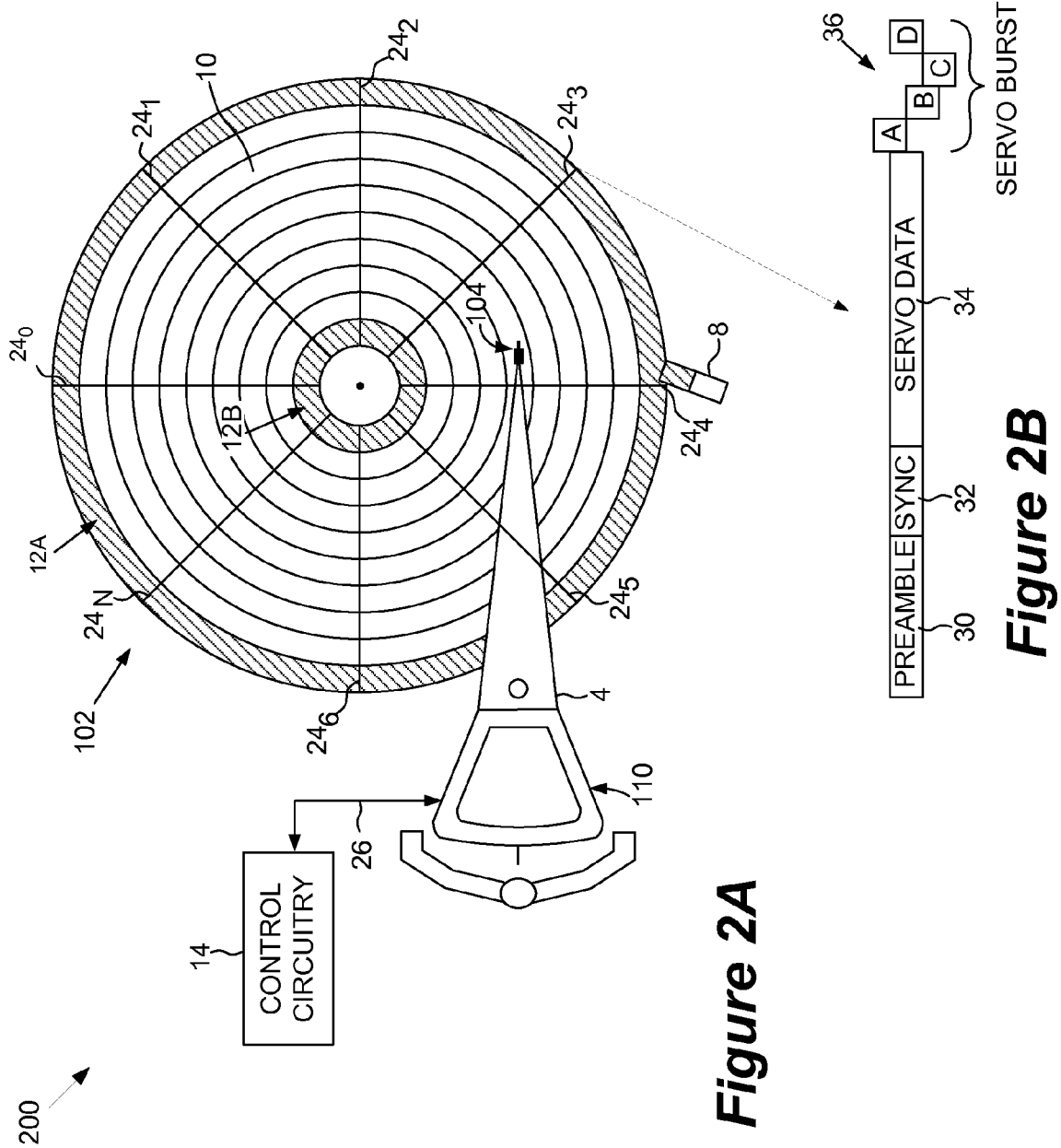
FIG. 2A shows another disk drive/data storage system according to some embodiments of the invention.
FIG. 2B illustrates the format of a servo sector according to some embodiments of the invention.

In some embodiments, the disk 102 comprises a plurality of servo sectors $24_0$-$24_N$ that define the plurality of data tracks 10 and the sets of reserved tracks 12A and 12B. The control circuitry 14 processes the read signal to demodulate the servo sectors $24_0$-$24_N$ into a position error signal (PES). The PES is filtered with a suitable compensation filter to generate a control signal 26 applied to a voice coil motor (VCM) 110 which rotates the actuator arm 4 about a pivot in order to position the head 104 radially over the disk 102 in a direction that reduces the PES. The servo sectors $24_0$-$24_N$ may comprise any suitable position information, and in some embodiments, as is shown in FIG. 2B, each servo sector comprises a preamble 30 for synchronizing gain control and timing recovery, a sync mark 32 for synchronizing to a data field 34 comprising coarse head positioning information such as a track number, and servo bursts 36 which provide fine head positioning information. The coarse head position information is processed to position a head over a target track during a seek operation, and the servo bursts 36 are processed to maintain the head over a centerline of the target track while writing or reading data during a tracking operation.

Operations During Power Down

Figure 3:
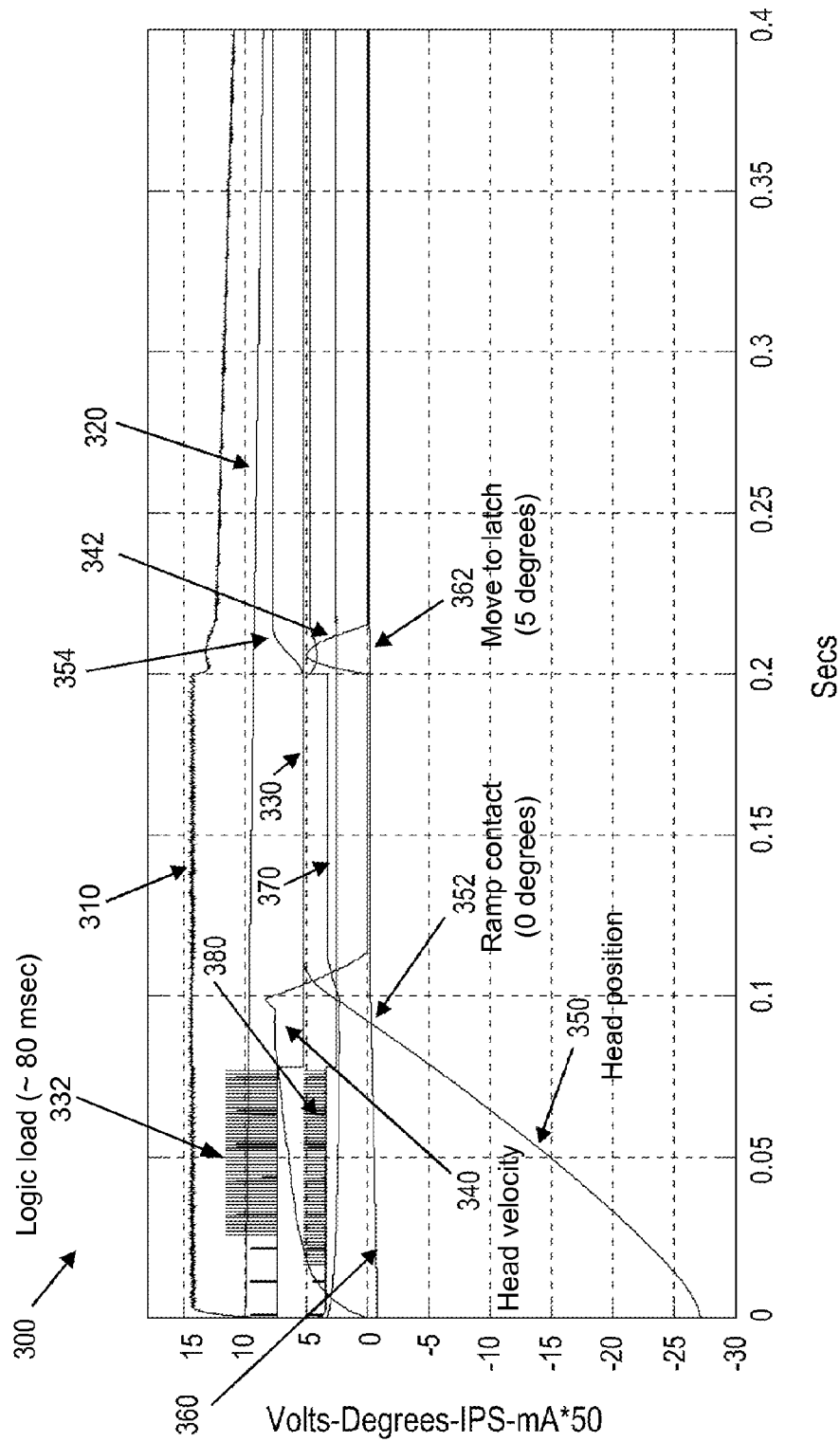
FIG. 3 illustrates a power down sequence according to some embodiments of the invention.

In some embodiments, a disk drive performs several operations during power down, including parking the head and programming data into non-volatile memory (e.g., to save any data stored in a volatile memory cache). In some embodiments data programmed into non-volatile memory can include user and system data. FIG. 3 illustrates a power down sequence 300 according to some embodiments of the invention. The x-axis represents time in seconds and the y-axis represents units for the various illustrated lines, such as volts, degrees, inches per second, and miliamperes (scaled).

Line 310 reflects an internal supply voltage Vpwr (generated from BEMF), which is shown as degrading from about 15V to about 10V. Those skilled in art would appreciate that these depicted voltage levels are for illustrative purposes only and that other voltage levels/ranges may be used. In this example, the voltage levels correspond to desktop disk drives, which typically require a 12V power supply. Those skilled in the art would appreciate that some embodiments can represent portable or mobile disk drives, which typically require a 5V power supply. Line 320 reflects the rotational speed of the spindle motor, which is shown to slow down from about 10 kRPM (revolutions per minute) to about 8 kRPM.

Line 330 represents the current drawn from a secondary switching regulator by a load after a switching supply (which transforms small currents at high voltages to larger currents at lower voltages) has converted Vpwr voltage from low current, high voltage signal to high current, low voltage signal. That is, current drawn from the internal supply depends on the voltage of the supply. Region 332 represents the current drawn by non-volatile memory during programming, which is larger than current drawn during idle periods. Line 340 represents head velocity. As is illustrated, the head is being moved into a parked position, and in region 342 the head is parked on a ramp. Line 350 represents the head position. When the head is being parked, it is moved to a zero degree position 352, which corresponds to a ramp contact. The head continues to go up the ramp, and in region 354 (which also corresponds to region 342), the head moves into the parked position. Line 360 represents ramp contact. Region 362 reflects the head moving into a latched position on the ramp. Line 370 represents the current drawn by VCM. Line 380 represents the same current as line 330, but the current represented by line 380 is drawn from the internal supply.

As is illustrated in FIG. 3, there is enough energy available in the internal supply to park the head and store data in non-volatile memory. However, in some embodiments, a conflict may arise when the VCM demands more current to park the head. Because the VCM can draw large and sudden peak currents, there may be time periods when there is not enough energy available to program data into non-volatile memory.

Power Transfer

Figure 4:
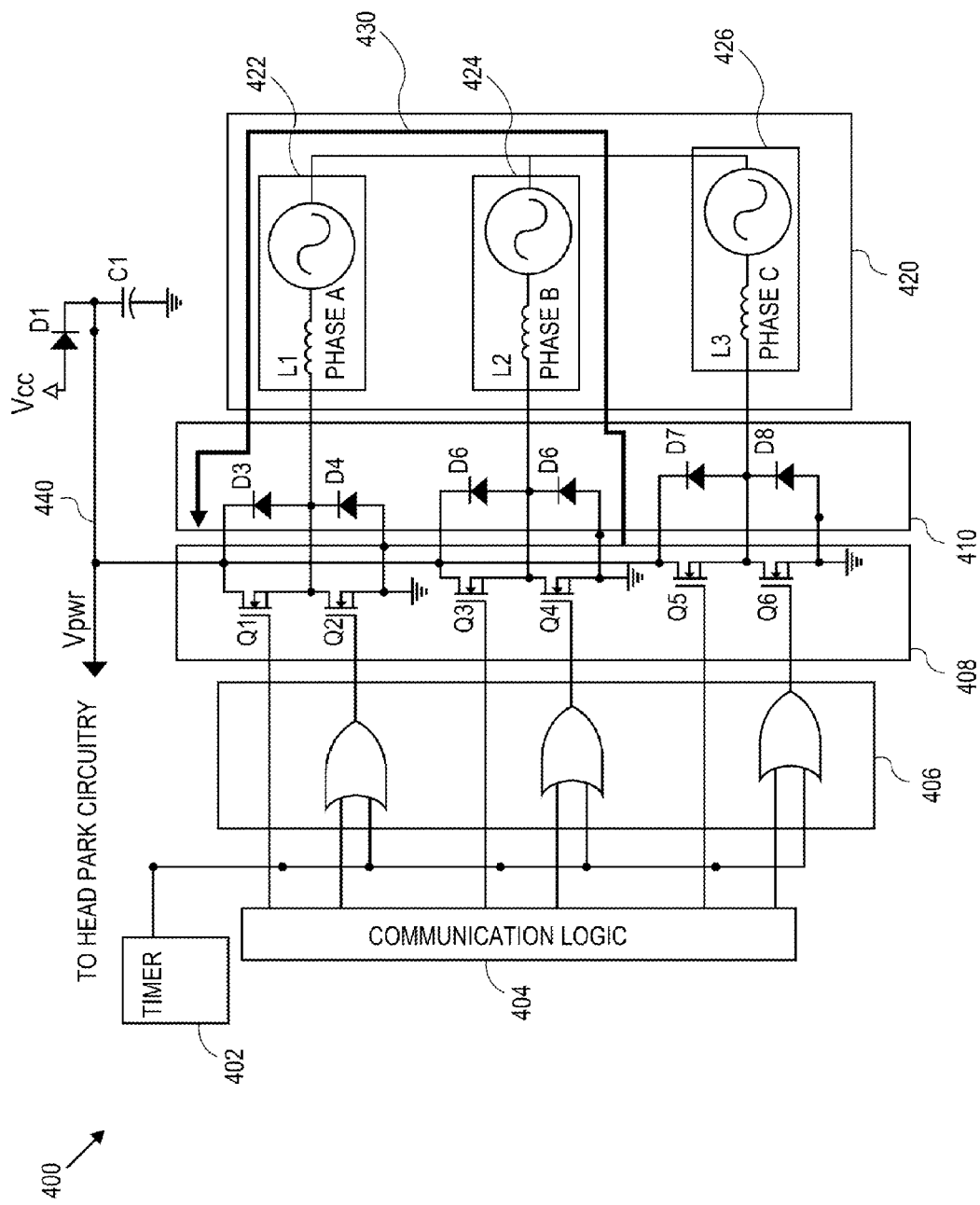
FIG. 4 shows spin down circuitry according to some embodiments of the invention.

As is explained above, when the disk drive loses power, BEMF voltage of the spindle motor is used to generate an internal supply voltage Vpwr for parking the head and for performing other power down operations. FIG. 4 illustrates spin down circuitry 400 that generates the internal supply voltage according to some embodiments of the invention.

A spindle motor 420 comprises a plurality of windings 422, 424, and 426, wherein a rotor generates BEMF voltage across the windings proportional to the spin rate of the rotor. The spindle motor illustrated in FIG. 4 is a three phase motor comprising three windings. BEMF voltage in each of the windings will be positioned 120 degrees out of phase with respect to the other windings. For example, at a given time, the phase of BEMF voltage signal in winding 422 can be 120 degrees, the phase of BEMF voltage signal in winding 424 can be 240 degrees, and the phase of BEMF voltage signal in winding 426 can be 0 degrees. Although a three-phase configuration is shown, those skilled in the art would appreciate that other number of phases can be used as well in other embodiments.

A plurality of switching elements 408 are coupled to the windings, and switch control logic 402, 404, and 406 generates switch control signals applied to the switching elements for commutating the spindle motor during normal operation and for generating an internal supply voltage Vpwr 440 from the BEMF during the spin down mode. A rectifier circuit 410 for rectifying the generated voltage is coupled to the windings 422, 424, and 426.

In some embodiments, Vpwr 440 can be generated using synchronous rectification. Commutation logic 404 turns on the switches 408, which creates a path between the windings and ground. With simple rectification, the most positive phase of BEMF voltage in the windings will drive the Vpwr terminal, while the most negative phase will drive the ground terminal. The diodes in the rectifier circuit 410 rectify the AC voltage. This circuit is equivalent to a transformer circuit. Its impedance is comprised of the impedance of windings inductors and of the switching transistors. FIG. 4 illustrates a current path 430 between winding 422 (e.g., in which the phase of BEMF voltage signal is 120 degrees, that is most positive) and winding 424 (e.g., in which phase of BEMF voltage signal is 240 degrees, that is most negative) serving as the ground terminal. Accordingly, voltage will be supplied to Vpwr 440 rail. With synchronous switching, the commutation logic 404 can be configured to turn on the switches 408 synchronously with the windings, thereby reducing power losses in the diodes by providing a lower voltage, lower impedance current path during rectification. Such augmenting of the diodes by the switching action results in synchronous rectification of BEMF voltage. As is used herein, synchronous rectification includes both simple rectification and/or synchronous switching.

In some embodiments, Vpwr 440 can be generated using "boost braking," as is described in U.S. Pat. Nos. 6,459,361, 6,549,359, and 6,577,465. The disclosure of each of these patents is hereby incorporated by reference in its entirety. In one embodiment, a periodic signal is generated by a timer 402 for periodically shorting the windings 422, 424, and 426 during the spin down mode in order to boost the internal supply voltage Vpwr 440, wherein shorting the windings applies a braking torque to the spindle motor. When the windings are temporarily shorted, a current builds up in the inductance of the windings and energy is stored in the inductors. The generated current will follow the same current path 430. Because of the energy storage in the windings, Vpwr 440 will rise above the BEMF voltage. In some embodiments, Vpwr 440 will rise to whatever voltage is needed to drive the currents in the inductors toward zero.

In some embodiments, BEMF voltage can be used to charge a capacitor or network of capacitors, and the stored energy can be used to power a logic load and/or other components in the disk drive/data storage system, as is explained below.

Demand Regulation

In some embodiments, a conflict may arise when the VCM demands more current (which is supplied by the Vpwr terminal) to park the head in the spin down mode during power down. There may not be enough power available to program data in the non-volatile memory. However, non-volatile memory programming may not tolerate power interruptions because data could become corrupted.

Figure 5:
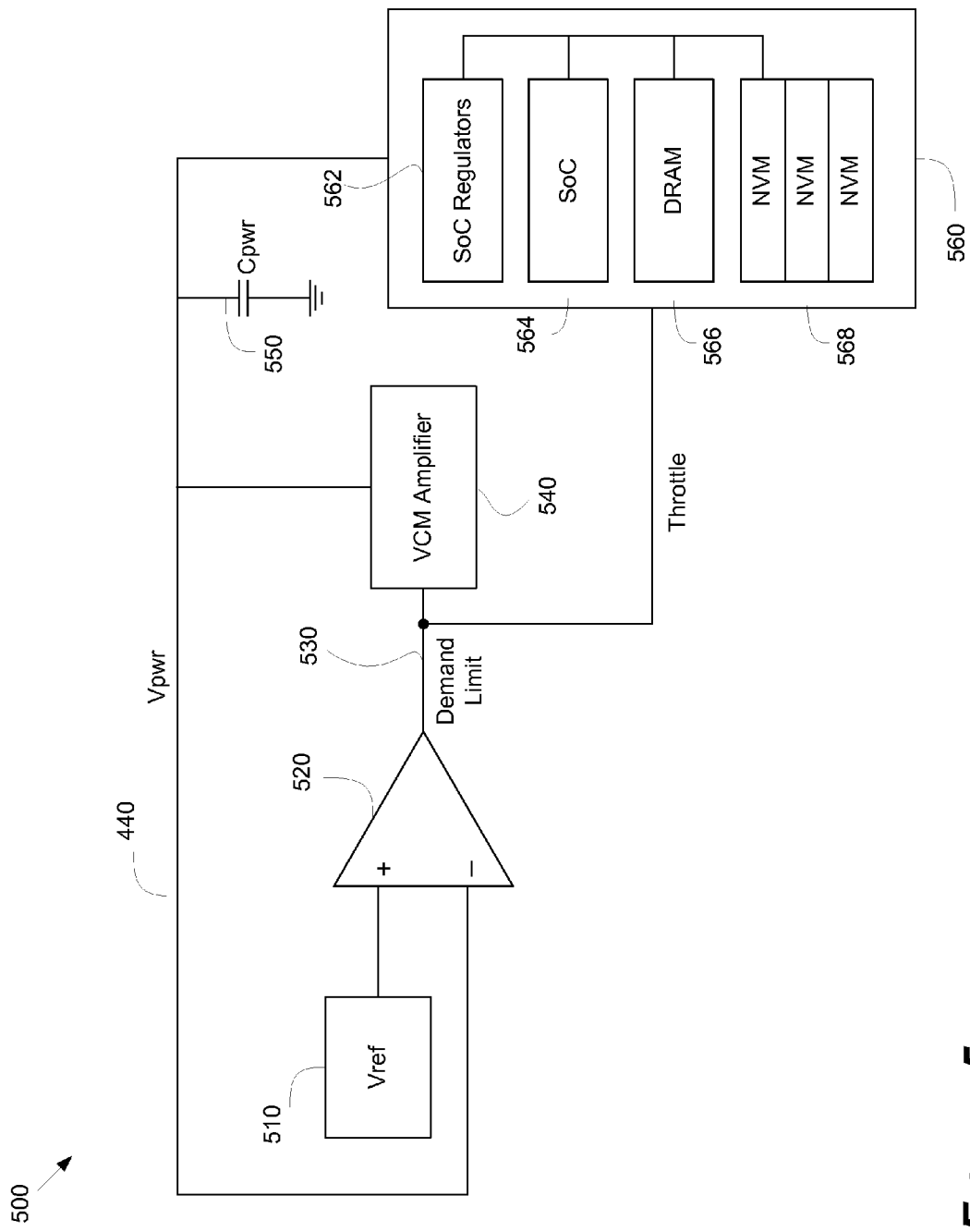
FIG. 5 shows demand regulation circuitry according to some embodiments of the invention.

In some embodiments, power throttling of a logic load (e.g., in a non-volatile memory controller, non-volatile memory, etc) can be used to provide an optimal power transfer and usage. FIG. 5 illustrates demand regulation circuitry 500 according to some embodiments. As is explained above, the internal supply voltage Vpwr 440 is generated from the BEMF during spin down. Vref 510 represents a voltage threshold selected for an optimal power transfer. For example, Vref can be higher for desktop disk drives and lower for portable disk drives.

In some embodiments, a comparator 520 compares voltage Vpwr 440 with the Vref 510 threshold. When voltage Vpwr 440 falls below the Vref 510 threshold, the comparator 520 can generate a throttle signal 530 (e.g., discrete digital signal) used for informing the logic load (which may cause it to take action to reduce its load partially or completely) and allowing Vpwr 440 voltage to recover. The logic load can be reduced in various ways. For example, where the logic load is in a controller for controlling data operations to non-volatile memory, the controller may elect to slow down its clock speed, shut off the clock, reduce its regulated voltage, or otherwise reduce its power usage. Because in some embodiments, solid-state non-volatile memory programming cannot be interrupted after it has commenced, asserting the throttle signal 530 can prevent the start of a new program cycle, but should not interrupt a programming cycle already in progress. In some embodiments, faster tiers of non-volatile memory can be selected or reserved to store data during power down. In some embodiments, parts or areas of non-volatile memory can be reserved for storing data during power down. Since there may be limited time (dictated by the energy available) to preserve data in a power down situation, certain portions of the memory with faster programming times may be reserved for this purpose. Such parts of the non-volatile memory can be optimized for programming beforehand (e.g., during normal operation).

In some embodiments, a capacitor Cpwr 550 can be used to compensate for a ripple (i.e., drop) in voltage Vpwr 440. During the period when Vpwr is low, energy stored in the capacitor Cpwr 550 can be used to provide power to the load. Accordingly, the capacitor Cpwr 550 should be able to store enough energy (e.g., be large enough) to compensate for the ripple in Vpwr 440. In some embodiments, the capacitor Cpwr can be used to power the load when the throttle signal 530 has been asserted. For example, the capacitor Cpwr 550 can provide power to complete a programming cycle that is already in progress. As will be further explained below, in some embodiments more than one load may be used, and one capacitor (or several) may be coupled with the loads.

The logic load represented as block 560 in FIG. 5, and can comprise one or more of: system on chip (SoC) module 564 (e.g., to implement controller functions), SoC regulators module 562 for regulating power distributed to various logic components of the load, DRAM data buffer 566 (which can store data that should be programmed), and non-volatile memory module 568. Non-volatile memory module 568 can comprise single or multiple NVM die of various types, such as NAND flash die, NOR flash die, etc. In some embodiments, the SoC regulators module 562 can be part of the SoC module 564. As depicted in FIGS. 7A-7D, the logic load can be in a variety of configurations.

In some embodiments, when the throttle signal 530 has been asserted, the VCM amplifier 540 can still provide power to the VCM for parking the head. In some embodiments, VCM amplifier 540 can shut off power to VCM when the throttle signal 530 has been asserted. This is further described in the above referenced U.S. Pat. Nos. 6,459,361, 6,549,359, and 6,577,465.

Load Prioritization

Figure 6:
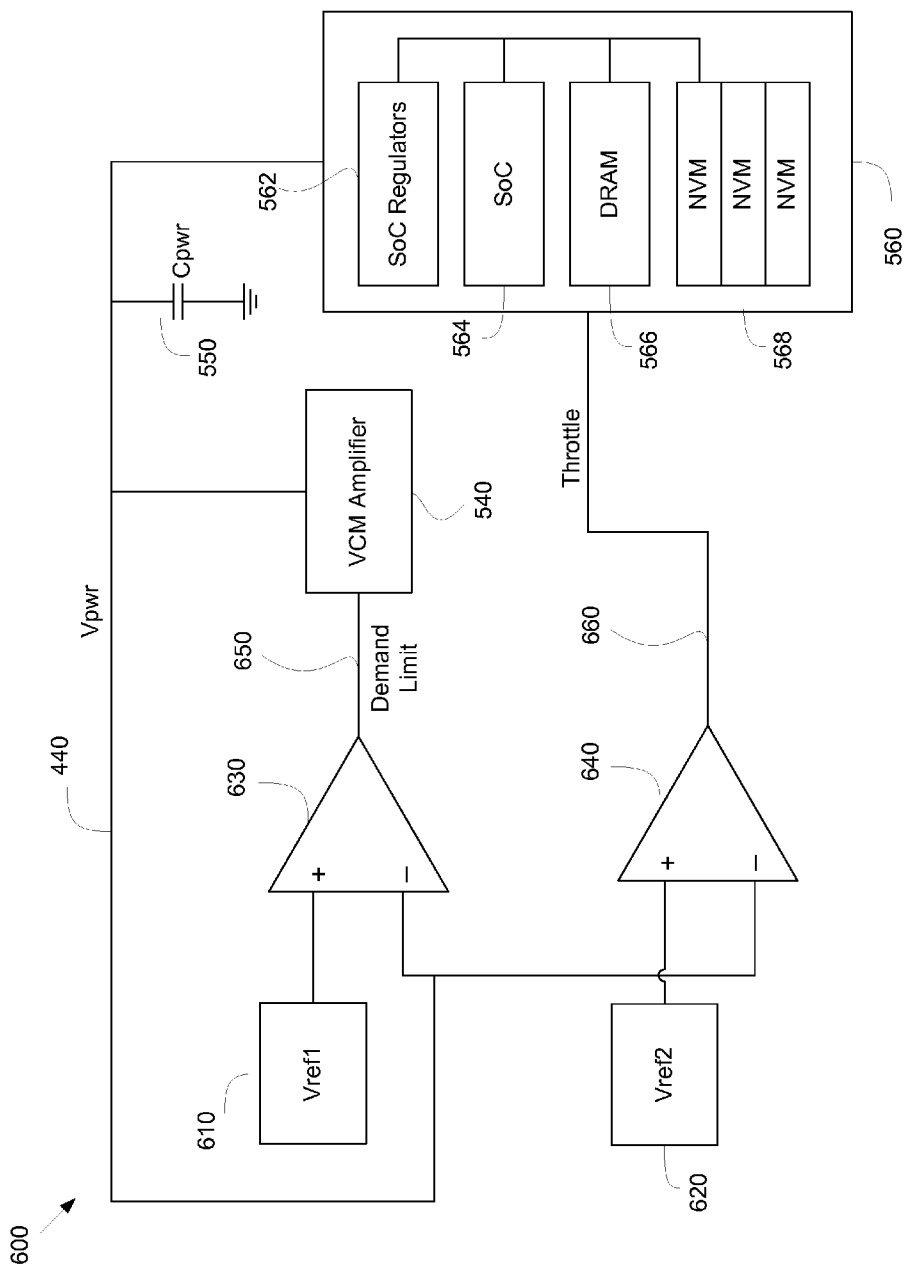
FIG. 6 shows demand regulation circuitry with prioritization according to some embodiments of the invention.

In some embodiments, load priority can be used to provide optimal power transfer and usage across several loads. As is illustrated in the system 600 of FIG. 6, several voltage thresholds Vref1 610 and Vref2 620 can be used to prioritize between different loads. As is illustrated, threshold Vref2 620 can correspond to a voltage threshold provided to a comparator 630 for generating a throttle signal 660 (e.g., discrete digital signal) for causing the logic load 560 to reduce its power use partially or completely (e.g., causing it to temporarily inhibit operation). This conserves the internal supply voltage for use by the VCM. Threshold Vref1 610 can correspond to a voltage threshold provided to a comparator 640, which may provide a demand limit signal 650 as an indication to the VCM (e.g., for temporarily turning off or on). In some embodiments, more than two thresholds levels can be tiered to throttle different loads, such as VCM, controller, different types of non-volatile memory, etc. Threshold Vref2 620 can be higher, lower, or same as threshold Vref1 610. In system 600, threshold Vref2 can be higher than threshold Vref1 because parking the head has higher priority than programming data. Although two example loads are shown here, the general concept can be expanded to any N number of loads (e.g., 3 to 10 or more) with one or more of the N loads associated with a different Vref value. For example, four loads may be present with two loads sharing a Vref1, a third load associated with a Vref2, and a fourth load associated with a Vref3.

Because different types of loads are independently controlled, power can be transferred optimally. For example, throttling the VCM in some embodiments results in controlling its power usage using pulse-width modulation and thus in an efficient power transfer. At the same time, providing optimal power transfer to the logic load in some embodiments does not involve the same considerations as controlling the VCM. In some embodiments, loads can be provided with separate power reservoirs (e.g., capacitors). Demand regulation can optimize the transfer of power, which in turn can increase data throughput and allow more data to be stored in the non-volatile memory. Accordingly, larger volatile memory cache can be used in the disk drive since more data from the cache can be written in case of power loss.

Logic Load Configurations

As previous discussed above, the logic load can be arranged in various ways. In some embodiments, as is illustrated in the system 700A of FIG. 7A, logic load can be within one or more of: a separate data buffer 710A, SoC module 720A, and non-volatile memory module 730A. Throttle signal 740A (e.g., discrete digital signal) generated by the demand regulator can be used to initiate throttling functions in the logic within at least SoC module 720A, which may in turn control programming of the non-volatile memory module 730A (e.g., to store any data in the data buffer 710A or a cache into non-volatile memory in the event of a power interruption). In a hybrid drive implementation with both hard disk and flash memory portions, the non-volatile memory module may include the flash memory portion of the drive.

Although a component or circuit may be described as being "throttled" below and throughout the disclosure, the precise functions performed by the corresponding component or circuit in response to a "throttle" signal may vary to reduce or eliminate power usage. For example, the data programming rates may be reduced with delays between cycles lengthened, or programming on multiple solid-state memory devices may be staggered. Additional examples are provided in FIGS. 8A-C and 9A-C. In other components with mechanical subparts such as VCM, certain actions may be delayed or a mode of operation may be altered. In some embodiments, the throttle signal 740A can be provided to the non-volatile memory module 730A to achieve throttling independent of the SoC. For example, the non-volatile memory module 730A can comprise a controller that can be throttled separately from the SoC module 720A. In some embodiments, non-volatile memory module can comprise a bridge device, which is described in a co-pending patent application Ser. No. 13/226,393, entitled "Systems and Methods for an Enhanced Controller Architecture in Data Storage Systems," filed Sep. 6, 2011, the disclosure of which is hereby incorporated by reference in its entirety. The bridge device can be throttled separately in some embodiments. In some embodiments, only the non-volatile memory module 730A (and not the SoC module 720A) can be throttled.

Figure 7A:
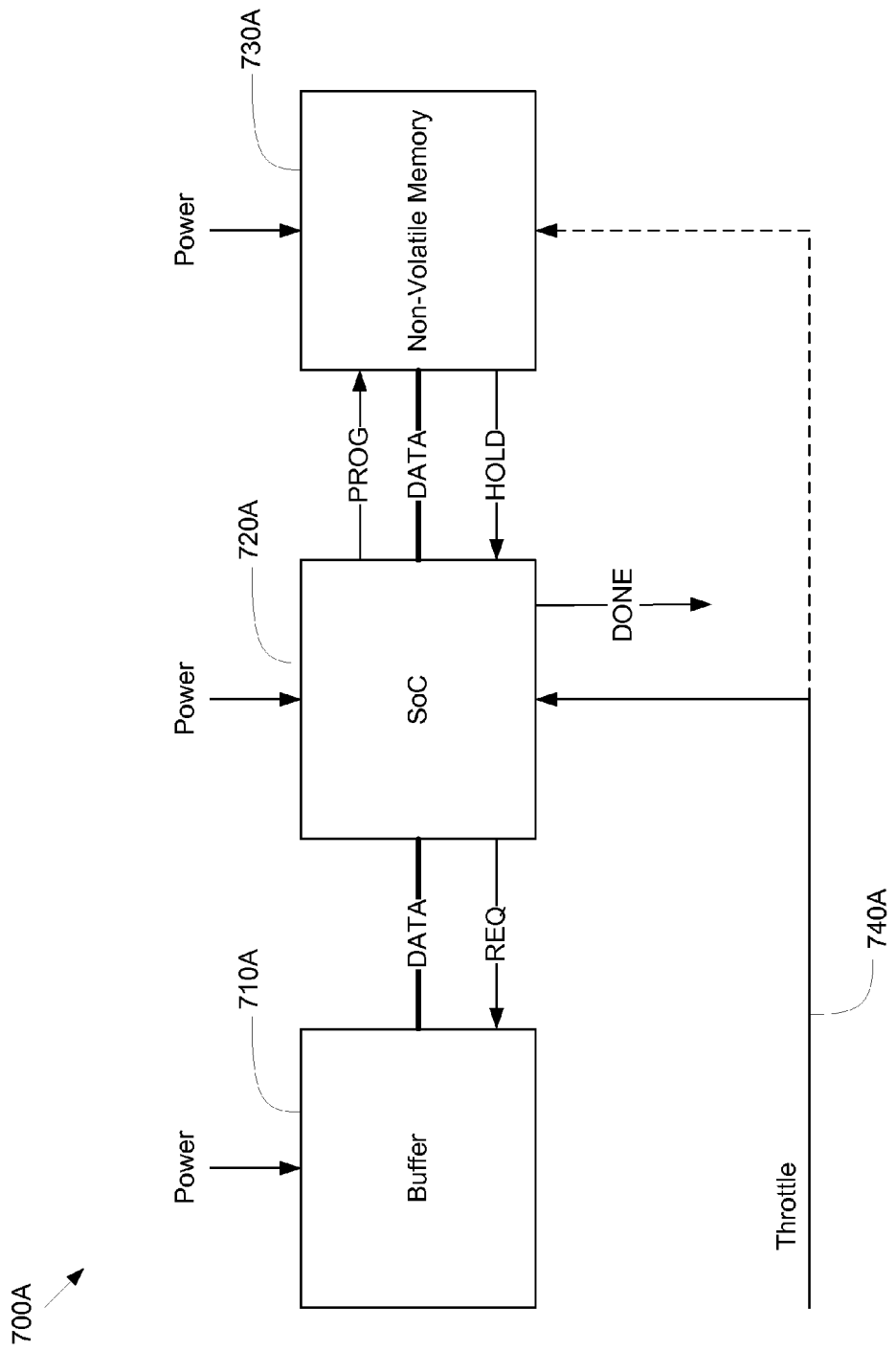
FIGS. 7A-7D show various arrangement of logic load according to some embodiments of the invention.
Figure 7B:
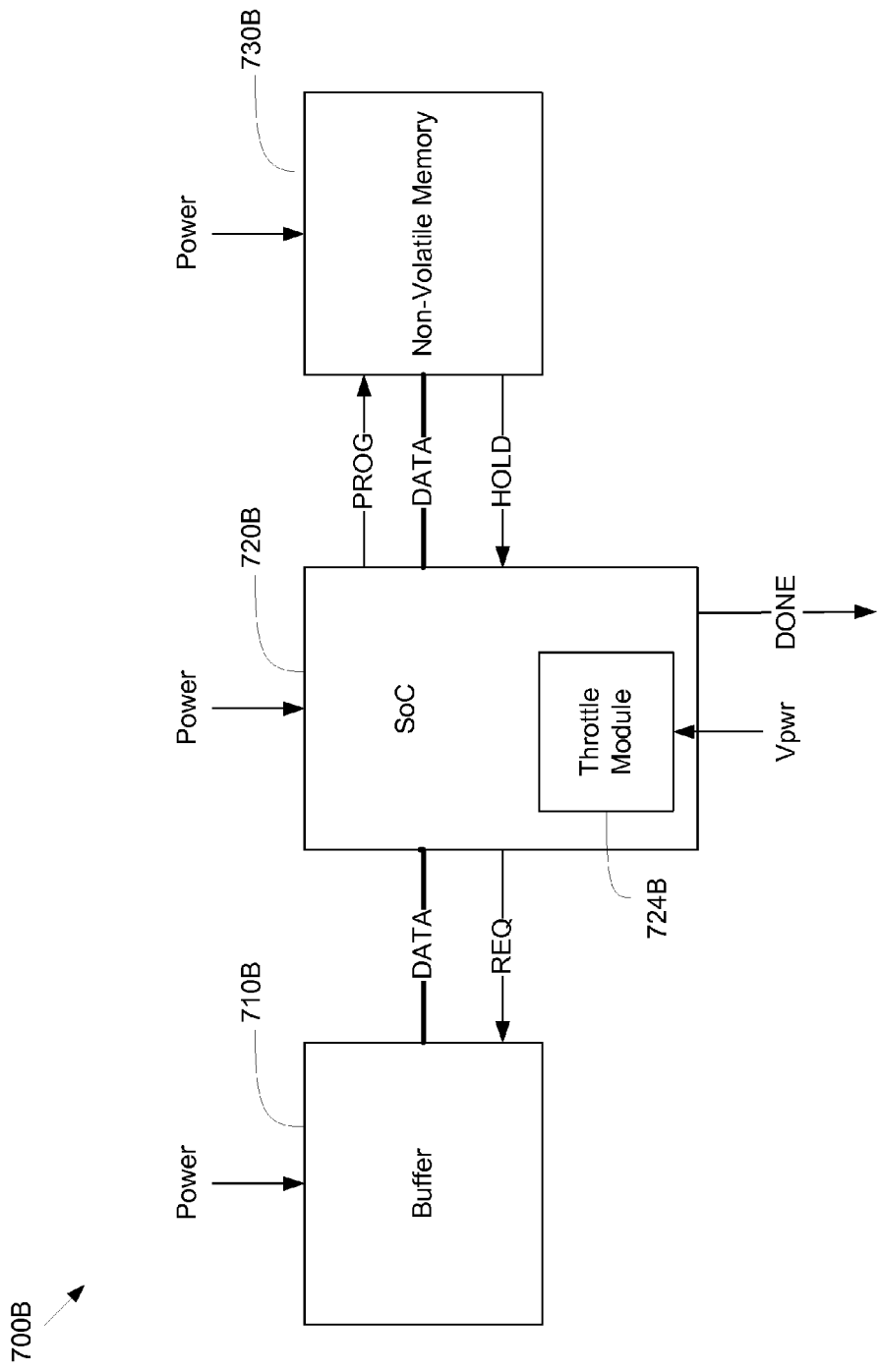

In some embodiments, as is illustrated in the system 700B of FIG. 7B, the SoC module 720B can comprise a throttle module 724B, which is implemented in hardware in one embodiment. The throttle module 724B monitors Vpwr rail and generates an indication (e.g., a signal) when Vpwr falls below a threshold. The SoC module 720B can then send a command (e.g., a THROTTLE_OPERATION command) to the non-volatile memory module to configure it to operate in a low power mode. In some embodiments, the command can be transmitted over a data bus or dedicated command bus. In some embodiments, in response to receiving the THROTTLE_OPERATION command, the bridge device of the non-volatile memory module 730B will not start new programming operations. This is further described in a co-pending patent application Ser. No. 13/226,393, entitled "Systems and Methods for an Enhanced Controller Architecture in Data Storage Systems," filed Sep. 6, 2011. In some embodiments, when the Vpwr voltage has recovered, the throttle module 724B can send another command (e.g., NORMAL_OPERATION) to configure the non-volatile memory module to operate in a normal mode. In some embodiments, the throttle module 724B can be a separate module, apart from the SoC module 720B.

Figure 7C:
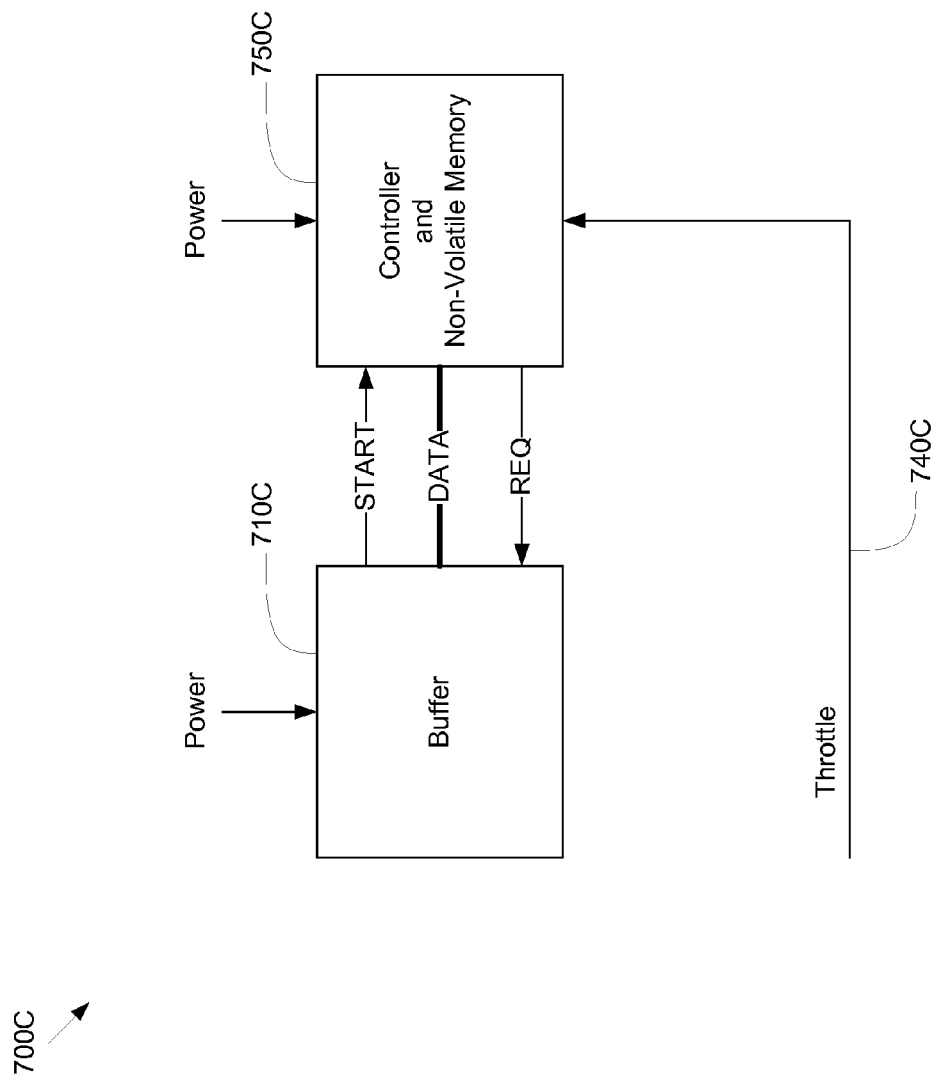

In some embodiments, as is illustrated in the system 700C of FIG. 7C, the controller can be integrated with the non-volatile memory module 750C. Programming data can be stored in a buffer 710C. The non-volatile memory module 750C can be throttled by a throttle signal 740C (e.g., discrete digital signal). In some embodiments, a SoC module may have already been powered off. In some embodiments, the module 750C can instead comprise the above described throttle module.

Figure 7D:
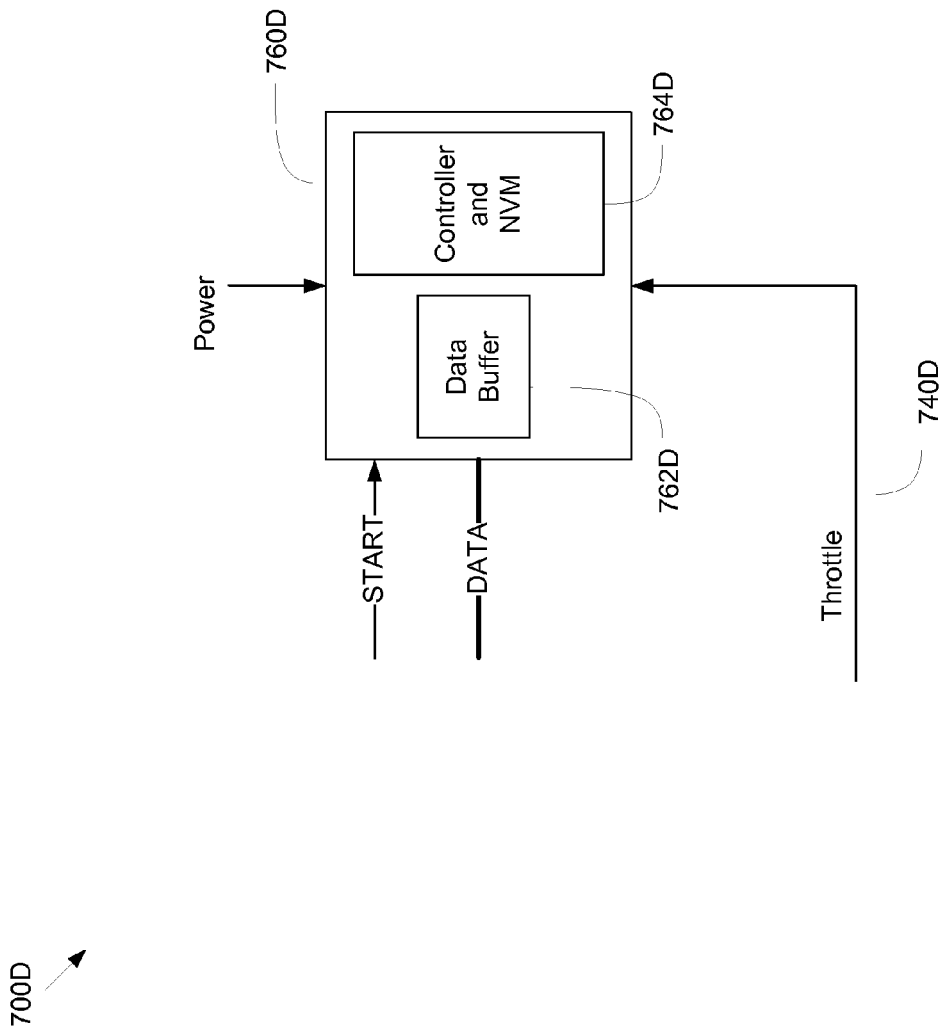

In some embodiments, as is illustrated in the system 700D of FIG. 7D, the buffer 762D can be integrated with the non-volatile memory module 760D. The module 760D can also comprise a controller and NVM module 764D, which can be throttled by a throttle signal 740D (e.g., discrete digital signal). In some embodiments, the module 760D can instead comprise the above described throttle module.

Load Staggering

In some embodiments, power transfer can be further optimized by staggering programming cycles of multiple non-volatile memory modules. In some embodiments, N non-volatile memory modules can be programmed using a round robin scheme in order to achieve load balancing (e.g., to even out the load). Other scheduling methods can be used to program the non-volatile memory, including weighted round robin, first in first out (FIFO) queuing, fair queuing, weighted fair queuing, etc.

In some embodiments, a programming sequence can be divided into N cycles or time periods. The periods can be of equal lengths (e.g., 1/N) or of different lengths. If at the end of each period (e.g., period Y/N) the throttle signal is not asserted, the next non-volatile memory module (e.g., module Y) can be programmed. However, if the throttle signal is asserted, the system will wait for the throttle signal to be deactivated before starting the next programming cycle. As previously started programming cycles are completed, the aggregate load connected to the Vpwr terminal will be reduced gradually. Vpwr voltage will recover because the loads stop drawing power and the BEMF voltage generated by the spindle motor replenishes the Vpwr rail.

Figure 8A:
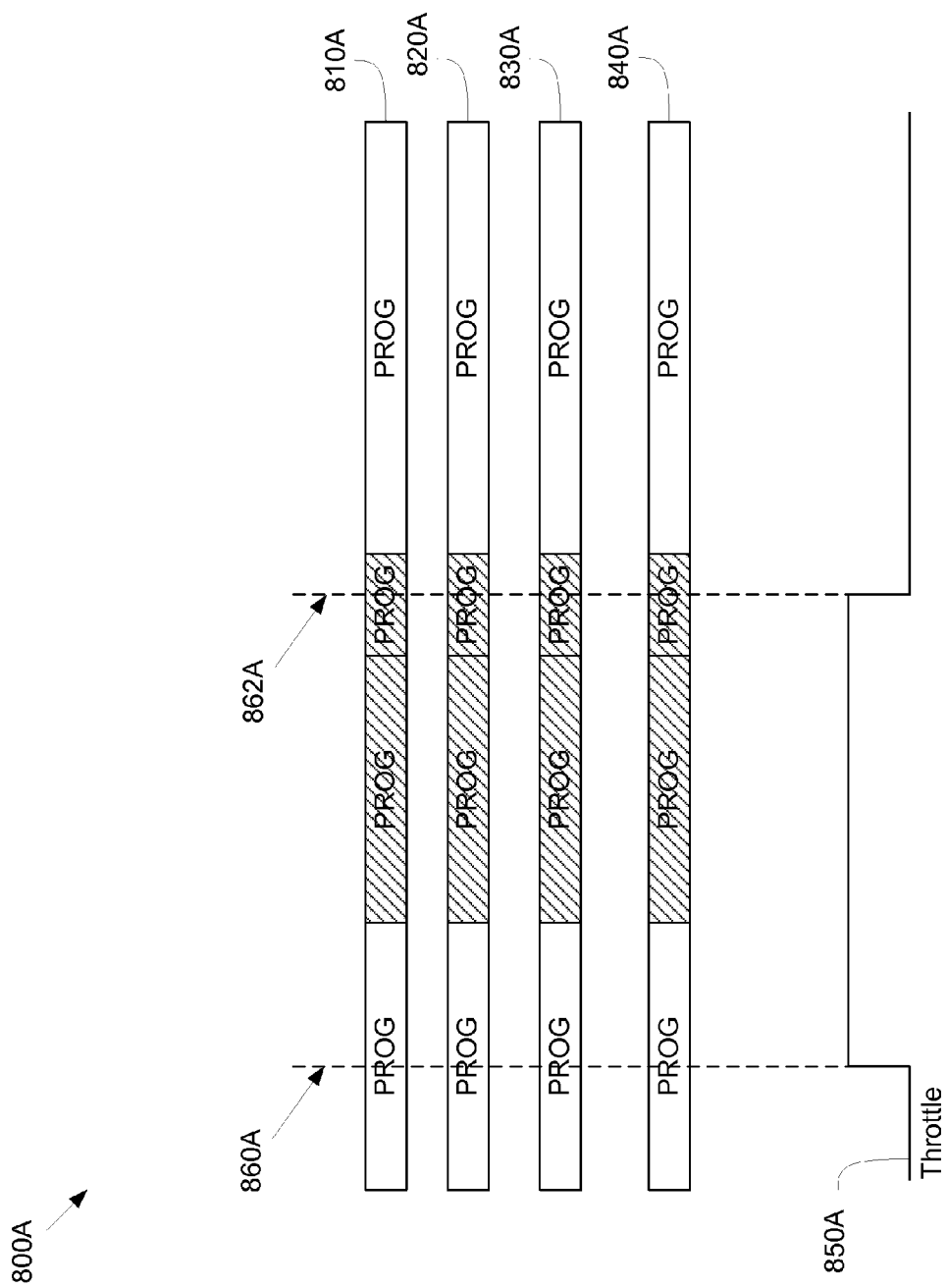
FIGS. 8A-8C illustrate load staggering according to some embodiments of the invention.

FIG. 8A illustrates operation of the system 800A in which programming cycle sequences 810A, 820A, 830A, and 840A are not staggered. In some embodiments, each box represents a programming cycle, and active cycles are illustrated in plain boxes while inactive (not-performed) cycles are illustrated in striped boxes. In some embodiments, the programming cycle sequences 810A, 820A, 830A, and 840A can correspond to programming cycle sequences of different non-volatile memory modules. As is illustrated, when the throttle signal 850A is asserted at time 860A, all four non-volatile memory modules are being programmed. In some embodiments, programming cycles that are already in progress must be completed before powering off the non-volatile memory. While the throttle signal 850A is active, subsequently scheduled programming cycles are not performed, as is illustrated by cross-hatched boxes in FIG. 8A. Programming resumes when the throttle signal 850A is deasserted at time 862A. Staggering program cycles in some embodiments can enable the controller to be paired with a smaller capacitor and can reduce variations in the controller's load on the internal supply voltage. In some embodiments, a capacitor is selected with a size that allows the internal supply voltage to increase a rate of recovery when the throttle signal causes the controller to reduce its load on the internal supply voltage.

Figure 8B:
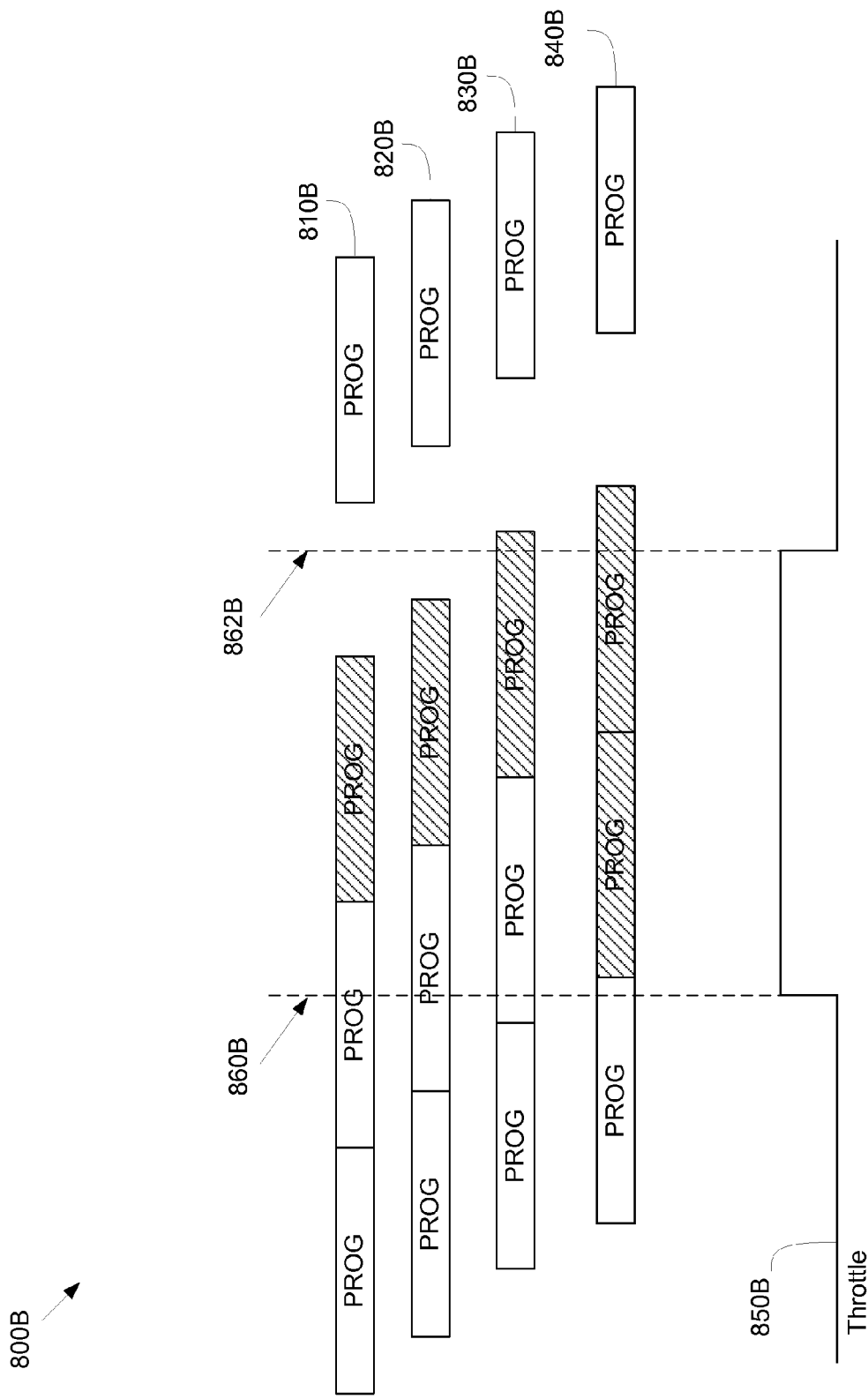

FIG. 8B illustrates operation of the system 800B in which programming cycle sequences 810B, 820B, 830B, and 840B are staggered. Active cycles are illustrated in plain boxes while inactive (not-performed) cycles are illustrated in striped boxes. As is illustrated, when the throttle signal 850B is asserted at time 860B, three programming cycles from sequences 810B, 820B, and 830B are already in progress. The system 800B will complete these cycles, but will not start the scheduled programming cycle from sequence 840B until the throttle signal becomes deasserted at time 862B. Load balancing allows Vpwr voltage to recover faster than in the system 800A of FIG. 8A. Programming cycles scheduled during the time period when the throttle signal 850B is active (these cycles are represented by cross-hatched boxes) will be delayed until the throttle signal is deasserted. In some embodiments, the timing and order of programming cycles can be maintained by the controller, as is illustrated in FIG. 8B.

Figure 8C:
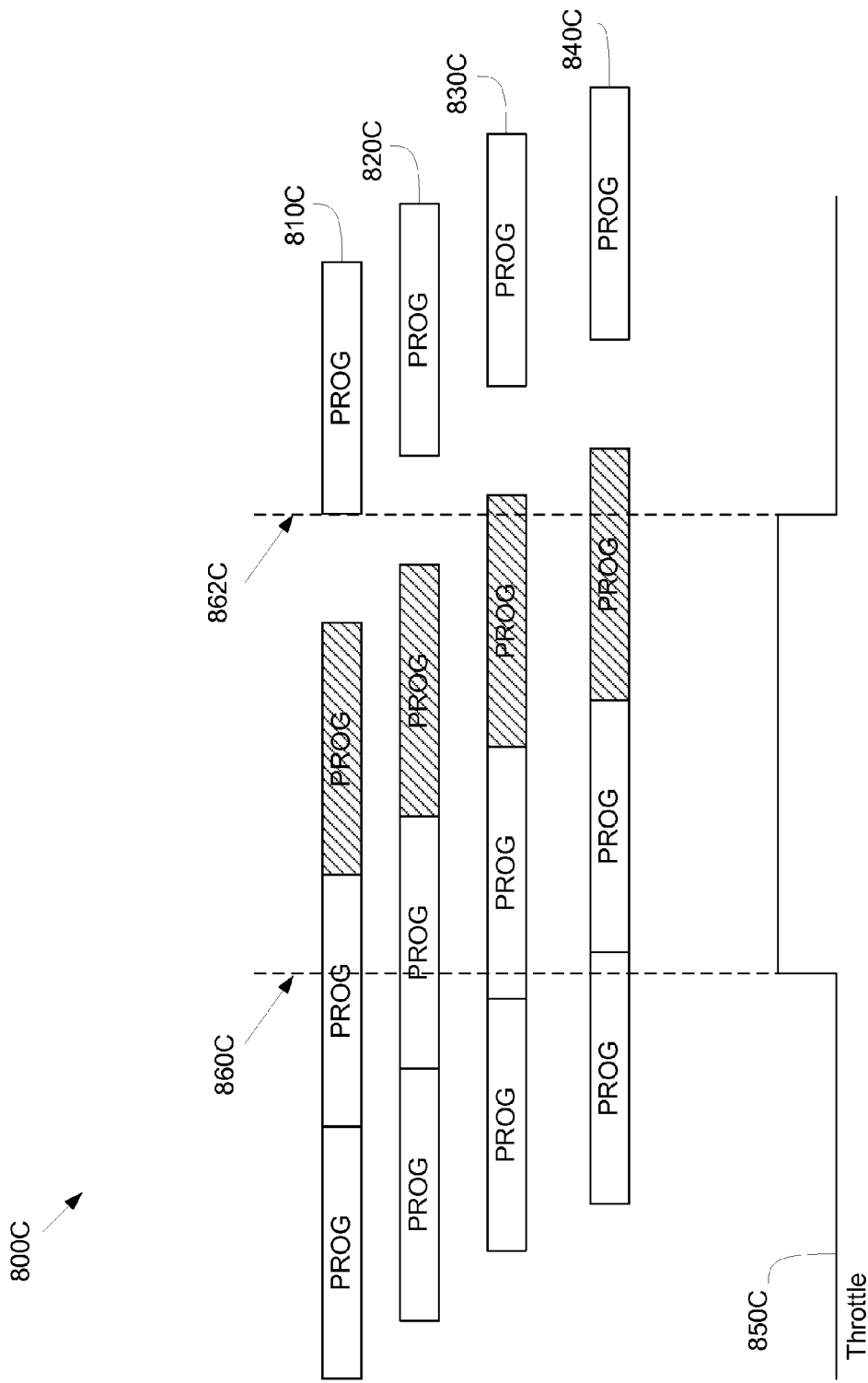

In some embodiments, as is illustrated in the system 800C of FIG. 8C, the controller can adjust the timing of programming cycles in accordance with the throttle signal 850C. When the throttle signal 850C is deasserted at time 862C, the programming cycle from the sequence 810C, which was delayed due to throttling, can be started immediately.

Figure 9A:
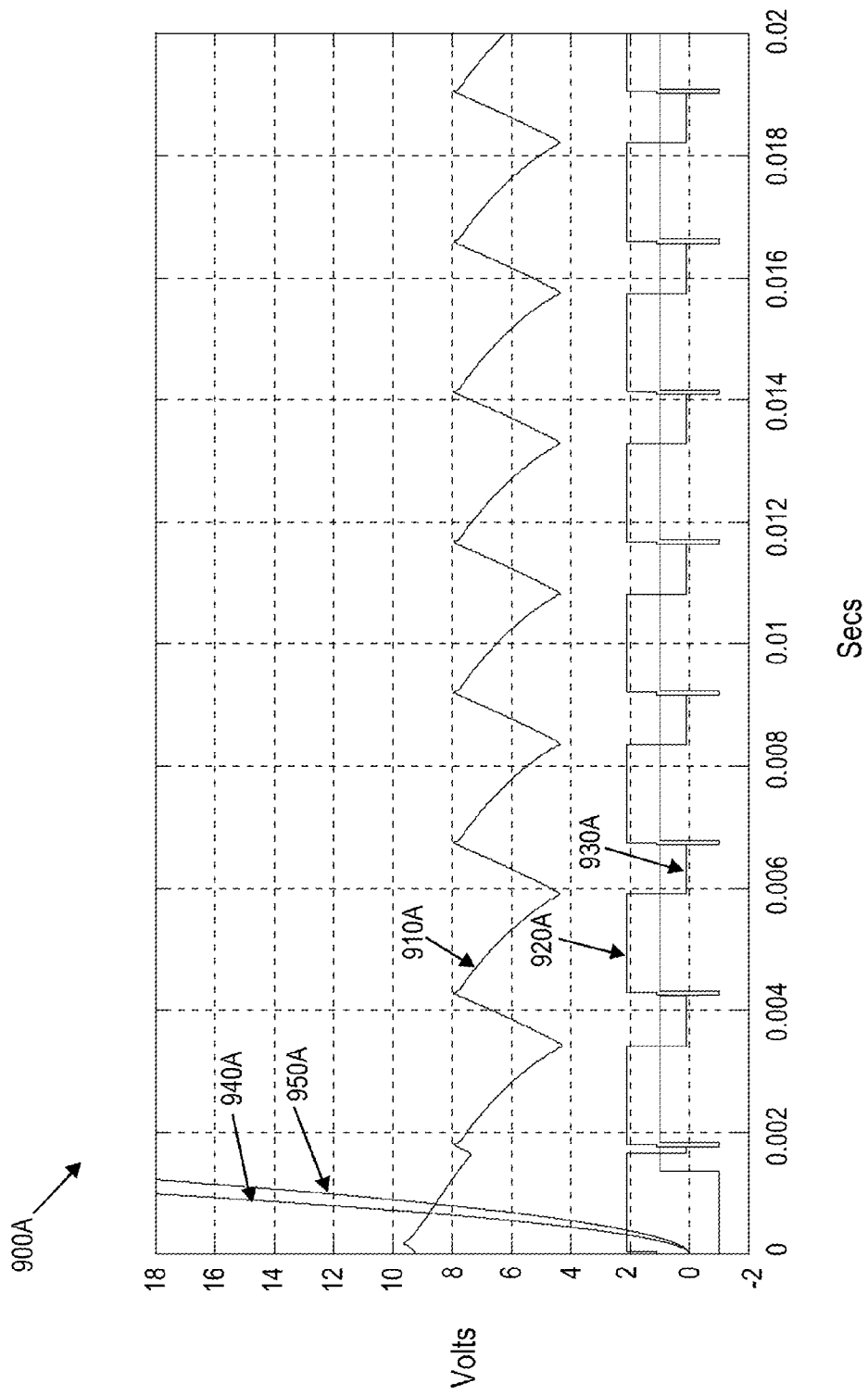
FIGS. 9A-9C illustrate effects of load staggering according to some embodiments of the invention.
Figure 9B:
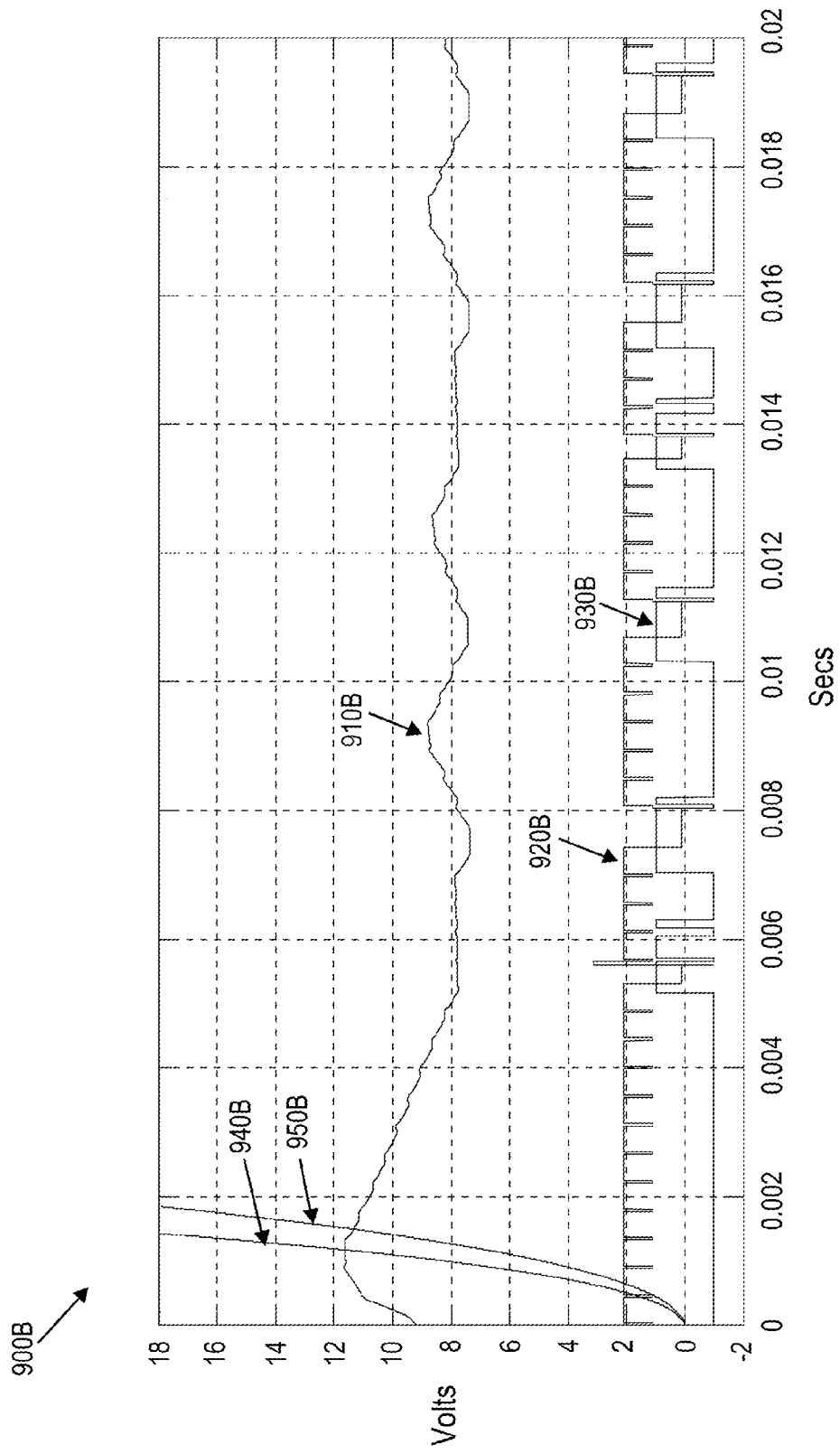
Figure 9C:
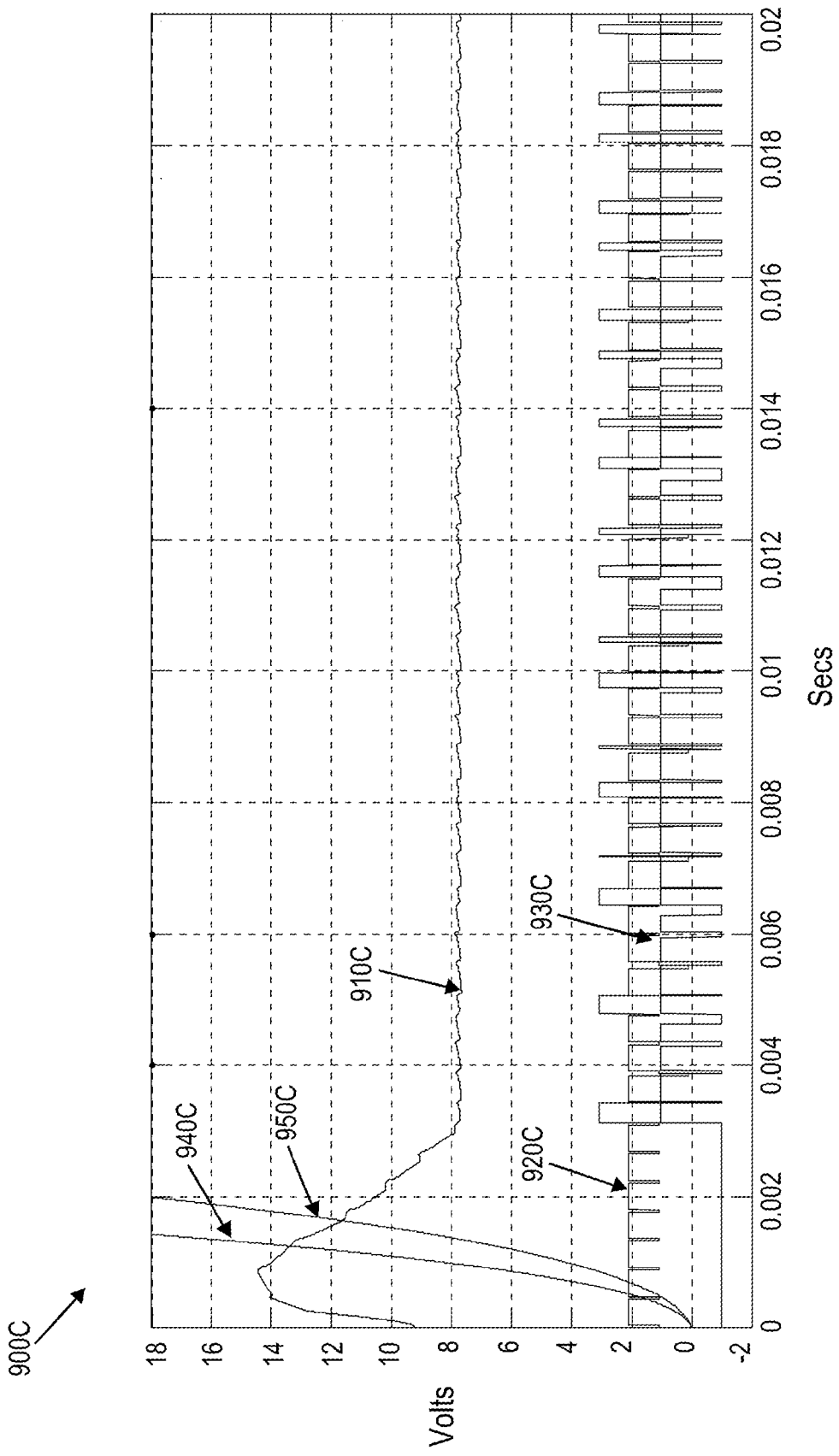

FIGS. 9A-9C illustrate the effects of load staggering according to some embodiments of the invention. FIG. 9A illustrates the performance of a system 900A in which programming cycles are not staggered (e.g., as is done in the system 800A of FIG. 8A). Line 910A represents Vpwr voltage, line 920A represents programming state of non-volatile memory (i.e., high signal indicates programming operation), and line 930A represents the throttle signal (i.e., high signal indicates asserted throttle signal). Line 940A represents the average current drawn by the load and line 950A represents the average source current provided by the spin down circuit. Due to the power drawn by the programming operations, the source current 950A rises to about 395 mA, while the load current 940A is at about 400 mA. Vpwr fluctuates between approximately 8V and 4.3V due to the power drawn by non-volatile memory programming. Throttle signal is asserted about 95% of the time, resulting in about 60% total programming duty cycle. Programming operations that are not started when the throttle signal is asserted are added to the end of the spin down cycle. Instead of causing Vpwr to sag too low, demand regulation slows down the frequency of programming operations and lengthens the total programming period.

FIG. 9B illustrates the performance of a system 900B in which programming cycles are staggered (e.g., as is done in the systems 800B of FIG. 8B and 800C of FIG. 8C). System 900B is otherwise the same as system 900A. Line 910B represents Vpwr voltage, line 920B represents programming state of non-volatile memory, and line 930B represents the throttle signal. Line 940B represents average current drawn by the load (which rises to about 442 mA) and line 950B represents the average source current provided by the spin down circuit. Staggering programming cycles of non-volatile memory modules effectively reduces the ripple along with response time (e.g., recovery period) of Vpwr terminal. As is illustrated, Vpwr fluctuates around 8.3V due to the power drawn by the programming operation. Vpwr does not drop as much and recovers more quickly than in the system 900A illustrated in FIG. 9A. Threshold signal is not asserted as often and is not asserted for as long of a duration.

As can be seen, the average data rate is increased because more programming cycles are being completed over the same period of time. In particular, about 20% more programming cycles are being completed in comparison with the system 900A illustrated in FIG. 9A. This is due to a more optimized power transfer during which less time is spent allowing Vpwr to recover (i.e., staggering increases the rate of recovery of Vpwr voltage). Efficiency of power transfer is also evidenced by comparing the average source current 950B, which is about 340 mA, to the larger average source current 950A, which is about 395 mA. Further, the peak source current is also reduced. Accordingly, load staggering optimizes power transfer and increases overall data throughput. Longer programming time and increased throughput allows for more data to be stored in the non-volatile memory. This in turn permits using a larger non-volatile memory cache size, which increases the performance of the disk drive.

Another advantage of load staggering is the use of a smaller Cpwr capacitor. Because Vpwr shown in FIG. 9B ripples less than Vpwr shown in FIG. 9A, a smaller capacitor can be used, which in turn results in significant cost savings in mass production. In some embodiments, using a smaller Cpwr capacitor can result in a faster response (i.e., recovery) of Vpwr terminal when staggering is used. This is because load staggering provides better control over the load (e.g., evens out the load) and reduces the power draw. FIG. 9C illustrates the performance of the system 900C in which programming cycles are staggered and Cpwr capacitor is four times smaller than that used in the system 900B of FIG. 9B. Line 910C represents Vpwr voltage, line 920C represents programming state of non-volatile memory, and line 930C represents the throttle signal. Line 940C represents the average current drawn by the load and line 950C represents the average source current provided by the spin down circuit. Due to the programming operations, the average source current 950A rises to about 348 mA, while the load current 940A is at about 440 mA. As is illustrated, Vpwr stays close to 8V and ripples less than in the system 900B of FIG. 9B, which uses a larger capacitor. Approximately the same number of programming cycles is completed over the same period of time. Accordingly, as illustrated in this example, the reduction in the size of Cpwr capacitor can actually increase data transfer rates (e.g., due to the shorter recovery of Vpwr), while significantly reducing production costs.

In addition, the peak source current is reduced as compared to the peak source current in the system 900B of FIG. 9B. Thus, the reduction in the size of Cpwr capacitor further optimizes power transfer because the reduction of peak source current lessens the power losses of the spindle motor (which are measured according to $I^2R$ formula).

In some embodiments, non-volatile memory modules may require different load currents. In addition, programming performance of non-volatile memory tends to degrade over non-volatile memory lifetime. In particular, programming tends to take longer as the non-volatile memory ages. Both of these conditions can be compensated for by measuring the period during which the throttle signal is active, which correlates to the amount of current used by a non-volatile memory module during programming. In addition, programming time of each non-volatile memory module can be monitored and measured. Using this information, the total current loads used by the logic load can be evened out by adjusting the programming duty cycle to compensate for non-uniform programming periods.

CONCLUSION

Figure 10:
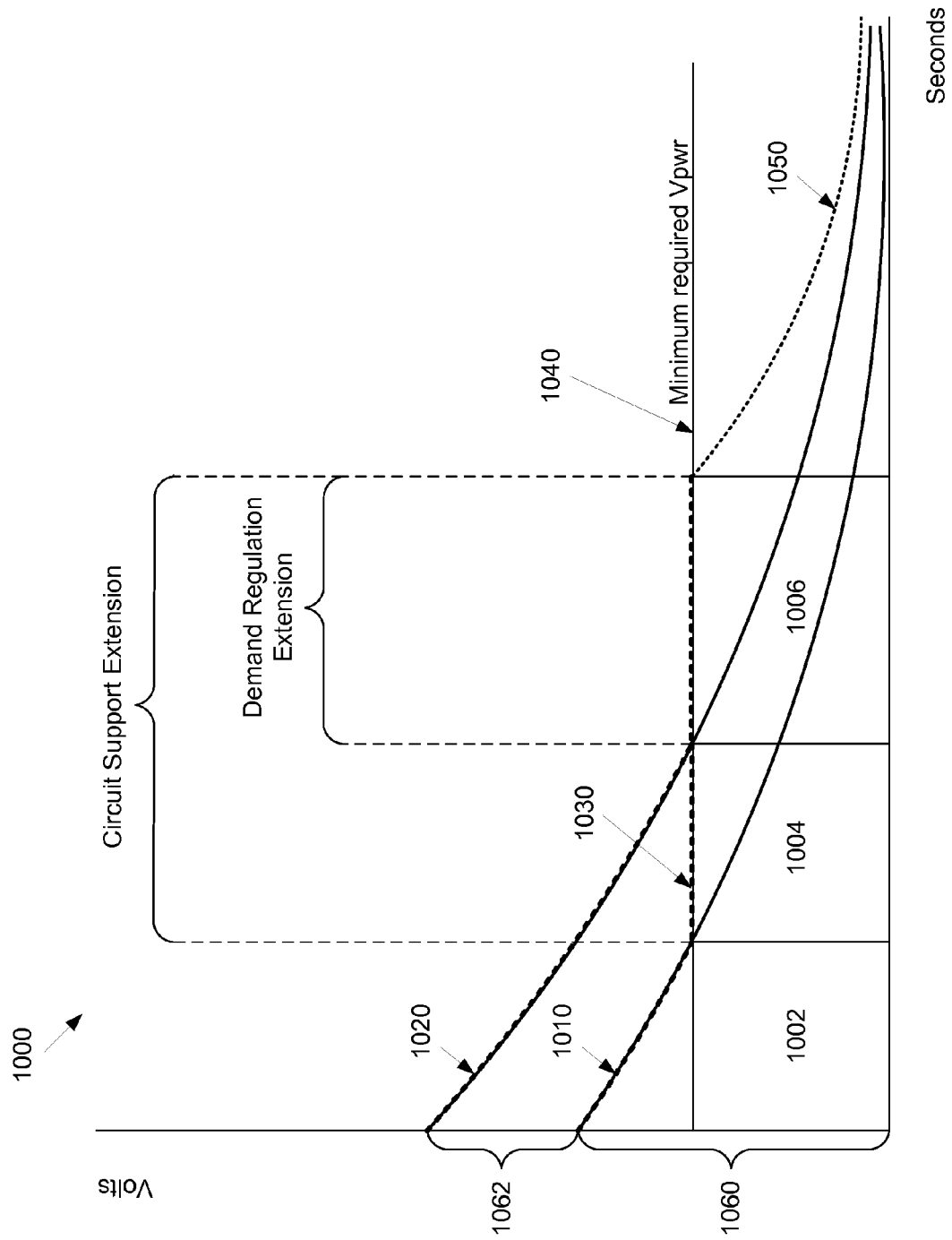
FIG. 10 illustrates power transfer improvements according to some embodiments of the invention.

FIG. 10 illustrates power transfer improvements according to some embodiments. Chart 1000 of FIG. 10 shows circuit voltage in comparison with the rectified BEMF voltage in the spindle motor. Curve 1010 corresponds to power transfer utilizing synchronous rectification driving the logic load. Peak voltage generated by synchronous rectification is indicated as 1060, and time available to power the load is indicated as region 1002. As can be seen, a few milliseconds are available to program data into non-volatile memory before Vpwr drops below the minimum required Vpwr voltage 1050.

Curve 1020 corresponds to power transfer utilizing boost brake circuit driving the logic load. The higher peak voltage generated by the boost brake circuit, which is indicated as voltage difference 1062, allows for a longer usable spin down time. In addition, consistent impedance of the boost brake circuit makes the performance more predictable. Thus, longer time is available to power the load when compared to synchronous rectification, as is indicated by region 1004.

Dotted piecewise curve 1030 corresponds to power transfer utilizing synchronous rectification with demand regulation. Curve 1030 overlaps with parts of the curve 1010. Because losses in the windings of the spindle motor are minimized, longer time is available to power the load and to program non-volatile memory, as is indicated by regions 1004 and 1006.

Dotted piecewise curve 1050 corresponds to power transfer utilizing boost braking with demand regulation. Curve 1050 overlaps with parts of the curve 1020. Because losses in the windings of the spindle motor are minimized, longer time is available to power the load and to program non-volatile memory, as is indicated by region 1006. Hence, demand regulation extends the total time during which non-volatile memory can be programmed and lowers the rate of power usage. This results in a more efficient power transfer, which in turn substantially increases the total amount of volatile memory cache that can be used to store data during normal operation since the more data in the cache can be saved to non-volatile memory in the event of a power interruption.

As is illustrated by regions 1062, 1004, and 1006 in FIG. 10, logic load circuit support using demand regulation with boost braking improves energy transfer and extends spin down time. In some embodiments, demand regulation with boost braking provides for more optimal power transfer than demand regulation with synchronous rectification.

OTHER VARIATIONS

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, non-volatile memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, Single-Level Cell (SLC) memory, Multi-Level Cell (MLC) memory, NOR memory, EEPROM, Ferro-electric Memory (FeRAM), or other discrete NVM (non-volatile memory) chips. The solid-state storage devices (e.g., dies) may be physically divided into planes, blocks, pages, and sectors, as is known in the art. Other forms of storage (e.g., battery backed-up volatile DRAM or SRAM devices, magnetic disk drives, etc.) may additionally or alternatively be used. In one embodiment, non-volatile memory may include a disk drive, as is described in U.S. Pat. No. 7,800,856, the disclosure of which is hereby incorporated by reference in its entirety. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system comprising:
    a disk;
    a head;
    a spindle motor for rotating the disk, the spindle motor comprising a plurality of windings and a rotor rotatable at a variable spin rate wherein the rotor generates a back EMF (BEMF) voltage across the windings proportional to the spin rate of the rotor;
    a plurality of switching elements coupled to the windings;
    switch control logic for generating switch control signals applied to the switching elements for generating an internal supply voltage from the BEMF during a spin down mode, the internal supply voltage enabling a controller to execute data programming operations for writing data from volatile memory to solid-state non-volatile memory in an event of a power interruption to the data storage system; and
    a demand regulation circuit configured to provide a throttle signal to the controller in response to detecting that the internal supply voltage has fallen below a first predetermined level;
    wherein the throttle signal causes the controller to lengthen delay periods between program cycles for the data programming operations to the solid-state non-volatile memory.

2. The data storage system of claim 1, wherein the throttle signal further causes the controller to perform at least one of:
    reducing a rate at which the data programming operations are executed; and
    matching the rate at which the data programming operations are executed to the internal supply voltage.

3. The data storage system of claim 1, wherein the throttle signal further causes the controller to stagger program cycles for the data programming operations to the solid-state non-volatile memory.

4. The data storage system of claim 3, wherein the controller is associated with a capacitor for storing reserve power for use by the controller, and wherein the controller is configured to stagger program cycles such that the size of the capacitor required by the data storage system to execute the program cycles is reduced.

5. The data storage system of claim 3, wherein the controller is configured to stagger program cycles to reduce variations in its load on the internal supply voltage.

6. The data storage system of claim 1, wherein the controller is associated with a capacitor whose size allows the internal supply voltage to increase a rate of recovery when the throttle signal causes the controller to reduce its load on the internal supply voltage.

7. The data storage system of claim 1, wherein the internal supply voltage further enables a voice coil motor (VCM) to park the head in the event of a power interruption, and wherein the throttle signal further causes the controller to temporarily inhibit operation, thereby conserving the internal supply voltage to be used for the VCM.

8. The data storage system of claim 7, wherein the demand regulation circuit is further configured to:
   in response to detecting that the internal supply voltage has fallen below a second predetermined level that is lower than the first predetermined level, prevent the internal supply voltage from being used by the VCM, thereby allowing the internal supply voltage to recover to at least the second predetermined level.

9. The data storage system of claim 1, wherein the controller is configured to lower its power usage in response to the throttle signal.

10. The data storage system of claim 1, wherein the controller is configured to perform one of more of the following in response to the throttle signal:
   reduce a speed of operation of a clock of the data storage system;
   reduce power usage of the controller; and
   halting the clock.

11. The data storage system of claim 1, wherein the switch control logic further comprises a boost brake circuit.

12. The data storage system of claim 1, wherein the switch control logic further comprises a synchronous rectification circuit.

13. A method for managing power in a data storage system during a spin down mode, the data storage system comprising:
   a disk;
   a head;
   a spindle motor for rotating the disk, the spindle motor comprising a plurality of windings and a rotor rotatable at a variable spin rate wherein the rotor generates a back EMF (BEMF) voltage across the windings proportional to the spin rate of the rotor;
   a plurality of switching elements coupled to the windings; and
   switch control logic for generating switch control signals applied to the switching elements for generating an internal supply voltage from the BEMF during a spin down mode, the internal supply voltage enabling a controller to execute data programming operations for writing data from volatile memory to solid-state non-volatile memory in an event of a power interruption to the data storage system,
   the method comprising:
   providing a throttle signal to the controller in response to detecting that the internal supply voltage has fallen below a first predetermined level;
   wherein the throttle signal causes the controller to lengthen delay periods between program cycles for the data programming operations to the solid-state non-volatile memory.

14. The method of claim 13, the method further comprising:
   in response to the throttle signal, performing at least one of the following in the controller:
   reducing a rate at which the data programming operations are executed; and
   matching the rate at which the data programming operations are executed to the internal supply voltage.

15. The method of claim 13, wherein the method further comprises performing the following in the controller:
   in response to the throttle signal, staggering program cycles for the data programming operations to the solid-state non-volatile memory, thereby increasing a throughput of data written to the solid-state non-volatile memory.

16. The method of claim 13, wherein the controller is associated with a capacitor for storing reserve power for use by the controller when the throttle signal is asserted, and wherein the controller is configured to stagger program cycles such that the size of the capacitor required to execute the program cycles is reduced.

17. The method of claim 13, wherein the controller is associated with a capacitor whose size allows the internal supply voltage to increase a rate of recovery when the throttle signal causes the controller to reduce its load on the internal supply voltage.

18. The method of claim 13, wherein the internal supply voltage further enables a voice coil motor (VCM) to park the head in the event of a power interruption, and wherein the throttle signal further causes the controller to temporarily inhibit operation, thereby conserving the internal supply voltage to be used for the VCM.

19. The method of claim 18, further comprising:
   in response to detecting that the internal supply voltage has fallen below a second predetermined level that is lower than the first predetermined level, preventing the internal supply voltage from being used by the VCM, thereby allowing the internal supply voltage to recover to at least the second predetermined level.

20. The method of claim 13, further comprising performing the following in the controller:
   lowering power usage of the controller in response to the throttle signal.

21. The method of claim 20, wherein the lowering further comprises performing one or more of the following in the controller:
   reducing a speed of operation of a clock of the controller; and
   halting the clock.

22. The data storage system of claim 1, further comprising a bridge device for managing the data programming operations in the solid-state non-volatile memory, and wherein the bridge device comprises the controller.

* * * * *